(12) United States Patent
Wu et al.

(10) Patent No.: US 10,956,849 B2
(45) Date of Patent: Mar. 23, 2021

(54) MICROSERVICE AUTO-SCALING FOR ACHIEVING SERVICE LEVEL AGREEMENTS

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US); Jun-Min Liu, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 80 days.

(21) Appl. No.: 15/720,396

(22) Filed: Sep. 29, 2017

(65) Prior Publication Data
US 2019/0102717 A1    Apr. 4, 2019

(51) Int. Cl.
*H04L 12/24*    (2006.01)
*G06Q 10/06*    (2012.01)

(52) U.S. Cl.
CPC ..... *G06Q 10/06375* (2013.01); *H04L 41/147* (2013.01); *H04L 41/5009* (2013.01); *H04L 41/5025* (2013.01)

(58) Field of Classification Search
CPC ............. H04L 41/5009; H04L 41/5025; H04L 41/147; G06Q 10/06375
See application file for complete search history.

(56) References Cited

U.S. PATENT DOCUMENTS

| | | | |
|---|---|---|---|
| 7,301,448 B1 * | 11/2007 | Usery | H04L 41/0613 340/506 |
| 7,496,655 B2 | 2/2009 | Gopalan et al. | |
| 7,729,270 B2 | 6/2010 | Bishop et al. | |
| 7,797,147 B2 | 9/2010 | Vinberg et al. | |
| 8,041,797 B2 | 10/2011 | Childress et al. | |
| 8,209,273 B2 | 6/2012 | Goris et al. | |
| 8,346,909 B2 | 1/2013 | Dan et al. | |
| 8,606,924 B2 | 12/2013 | Gujral et al. | |
| 8,862,738 B2 | 10/2014 | Madduri et al. | |
| 9,020,794 B2 | 4/2015 | Chen et al. | |
| 9,058,263 B2 | 6/2015 | Behrendt et al. | |
| 9,112,733 B2 | 8/2015 | Falk et al. | |
| 9,405,582 B2 | 8/2016 | Fuller et al. | |

(Continued)

FOREIGN PATENT DOCUMENTS

WO   WO 2001/017169 A2   3/2001
WO   WO 2017/039506 A1   3/2017

OTHER PUBLICATIONS

Buyya et al.; "InterCloud: Utility-Oriented Federation of Cloud Computing Environments for Scaling of Application Services"; Int'l Conf. on Algorithms and Architectures for Parallel Processing; 2010; 20 pages.

(Continued)

*Primary Examiner* — Jason D Recek
(74) *Attorney, Agent, or Firm* — BakerHostetler

(57) ABSTRACT

Methods and systems associated with a microservice based predictive service level agreement (SLA) impact analytics system that may run on standardized container based virtual computing platform to enable capacity auto-scaling for on-demand, near-real-time resource allocation automatically supporting user data packet forwarding when SLA is potentially impacted to ensure SLA compliance.

20 Claims, 10 Drawing Sheets

(56) References Cited

U.S. PATENT DOCUMENTS

| | | | |
|---|---|---|---|
| 9,667,552 | B2 | 5/2017 | Fisher et al. |
| 9,923,785 | B1* | 3/2018 | Li .................... H04L 41/5025 |
| 2009/0018813 | A1 | 1/2009 | Kothari et al. |
| 2009/0254411 | A1 | 10/2009 | Bhattacharya et al. |
| 2014/0279201 | A1* | 9/2014 | Iyoob .................... G06F 9/5077 705/26.7 |
| 2015/0262106 | A1 | 9/2015 | Diao et al. |
| 2015/0372878 | A1 | 12/2015 | Ganesan et al. |
| 2016/0013992 | A1 | 1/2016 | Reddy et al. |
| 2016/0036655 | A1 | 2/2016 | Burton et al. |
| 2016/0269312 | A1 | 9/2016 | Cavalcante et al. |
| 2016/0308734 | A1* | 10/2016 | Feller .................... H04L 41/5009 |
| 2016/0350173 | A1* | 12/2016 | Ahad .................... G06F 11/3495 |
| 2017/0063645 | A1 | 3/2017 | Testa et al. |
| 2017/0195201 | A1 | 7/2017 | Mueller et al. |

OTHER PUBLICATIONS

Chaudhuri, Surajit; "What Next? A Half-Dozen Data Management Research Goals for Big Data and the Cloud"; Proceedings of the 31$^{st}$ ACM Symposium on Principles of Database Systems; 2012; 4 pages.

Iqbal et al.; "Adaptive resource provisioning for read intensive multi-tier applications in the cloud"; Future Generation Computer Systems; vol. 27; 2011; p. 871-879.

"Service Level Management"; Interlink Software Services Ltd.; http://web.archive.org/web/20170208075149/https://www.interlinksoftware.com/service-level-management/; 5 pages.

Balakrishnan et al.; "Service Level Agreement based Grid Scheduling"; IEEE Int'l Conf. on Web Services; 2008; p. 203-210.

Wu et al.; "SLA-Based Resource Provisioning for Hosted Software-as-a-Service Applications in Cloud Computing Environments"; IEEE Transactions on Services Computing; 2014; p. 465-485.

* cited by examiner

MICROSERVICE AUTO-SCALING FOR ACHIEVING SERVICE LEVEL AGREEMENTS

BACKGROUND

Service Level Agreement (SLA) management is critical for carriers to meet customer expectations and experiences. SLA metric measuring methods are well defined in International Telecommunication Union standardization sector (ITU-T) (e.g., ITU-T Y.1540 or ITU-T Y.1541). SLA is violated if at least one SLA performance metric reaches a designated threshold value. In conventional systems, if SLA violation is detected, the operation takes re-active actions to repair customer services with a penalty to service providers as specified in the SLA.

SUMMARY

In a software-defined dynamic networking environment, the operations identify potential SLA impact and take near-real-time pro-active and predictive approach that leverages Software-Defined Network's (SDN's) capacity auto-scale capacity of user data packet forwarding running in virtualized computing platform to reduce potential customer service impacts (before they are actually impacted)

A microservice-based predictive service level agreement (SLA) impact analytics system may run on standardized container-based computing platform to enable capacity auto-scaling for on-demand, near-real-time resource allocation (e.g., reallocation) automatically when SLA is potentially impacted to ensure SLA compliance.

In an example, an apparatus may include a processor and a memory coupled with the processor that effectuates operations. The operations may include determining a predictive service level agreement (SLA) impact for a telecommunications service, the determining the predictive SLA may include: 1) monitoring data associated with a performance of the telecommunications service; 2) based on the monitoring of the data, obtaining a first alert, the first alert may include information affecting a network component (e.g., network device) associated with the telecommunications service; 3) determining that the first alert is a parent event; 4) based on the determining that the first alert is a parent event, determining that a first threshold associated with a potential impact to the SLA for the telecommunications service has been reached; and a second threshold associated with the potential impact to the SLA for the telecommunications service has been reached, wherein the second threshold is associated with a performance indicator of physical or virtual component (e.g., device); and 5) based on reaching the first threshold and second threshold within a measured time period, providing instructions to manipulate network resources in order to reduce the potential impact to the SLA for the telecommunications service. Reduction of the potential impact may include eliminating errors by switching routes or increasing bandwidth, computing processing availability, or memory in manner that will project over time, within the SLA period for example, to reduce the probability of reaching the actual SLA thresholds.

The providing instructions to manipulate network resources may include selectively transforming the steps of determining the predictive SLA into microservices, wherein the microservices are distributed across multiple virtual devices on a same physical device or the microservices are distributed across multiple physical devices. The providing instructions to manipulate network resources may include selectively transforming the telecommunications service into microservices, wherein the microservices are distributed across multiple virtual devices on a same physical device or the microservices are distributed across multiple physical devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Service level agreement (SLA) is a service contract between customers and service providers with penalty term if SLA is violated. SLA fault directly impacts customer experience perception. IP service SLA metrics may include key performance indicators (KPIs), such as packet loss, latency, delay variation, guaranteed bit rate.

SLA impact may be defined as a violation of an SLA. In other words, end-to-end availability or one of performance indicators specified in SLA crosses performance threshold specified in SLA in a given measured period (e.g., window of time), which usually results in a penalty to carriers.

Potential SLA impact may be defined as a capacity reduction event within a designated critical threshold level (e.g., 90%) of end-to-end availability or one of performance KPI metrics performance for user data packet forwarding is crossed. Potential SLA impact is for predictive operations before customer services are actually impacted (e.g., SLA violation). For example, packet loss rate reaches 90% or more (but less 100%) of the packet loss requirement specified in SLA performance metrics. To adequately measure a potential SLA impact (e.g., potential SLA violation), multiple measure metrics (e.g., at least two) should be compared, such as SLA KPI measure and corresponding available network resource capacity, and then determined to meet a threshold (e.g., a particular ratio or other numerical indicator). In an example, a potential SLA impact may occur if:

1) at least one SLA KPI performance indicator crosses a designed critical level (e.g., 90%); and 2) corresponding available network resource capacity below a designed critical level (e.g., 20%).

Once a SLA impact or potential SLA impact is detected, an SLA impact event alarm or potential impact event alarm may be generated. In a software-defined (SDN) networking environment, SLA impact may be based on significant network resource capacity reduction events for user data packet forwarding.

Disclosed herein is a predictive SLA impact analytics system that may be microservice based. The system may run on standardized container-based computing platform and may enable capacity auto-scaling for on-demand, near-real-time resource allocation (e.g., reallocation) when SLA is potentially impacted to ensure SLA compliance.

Figure 1:
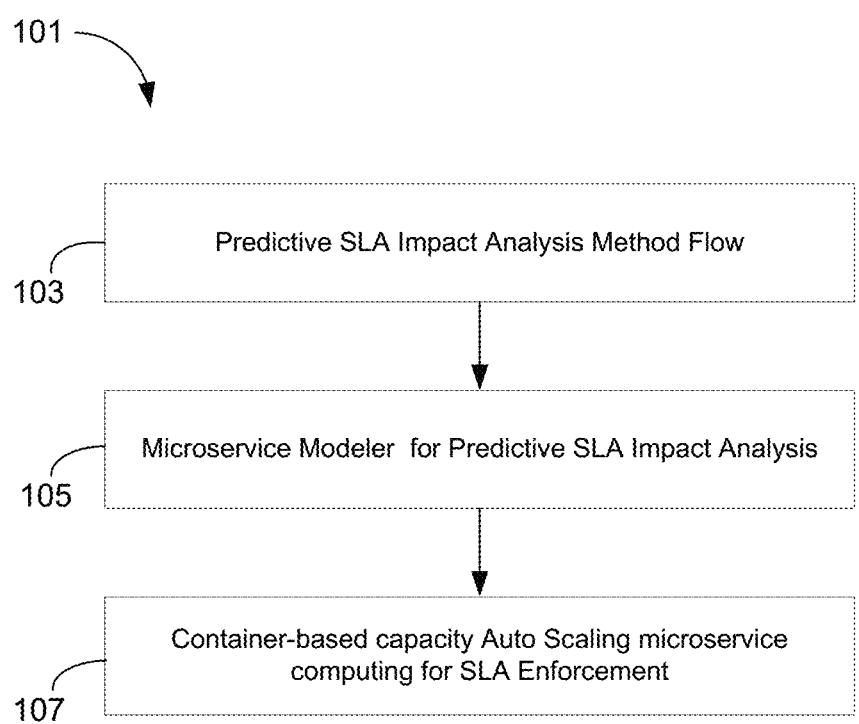
FIG. 1 illustrates exemplary components of a predictive SLA impact analytics system 101.
Figure 2:
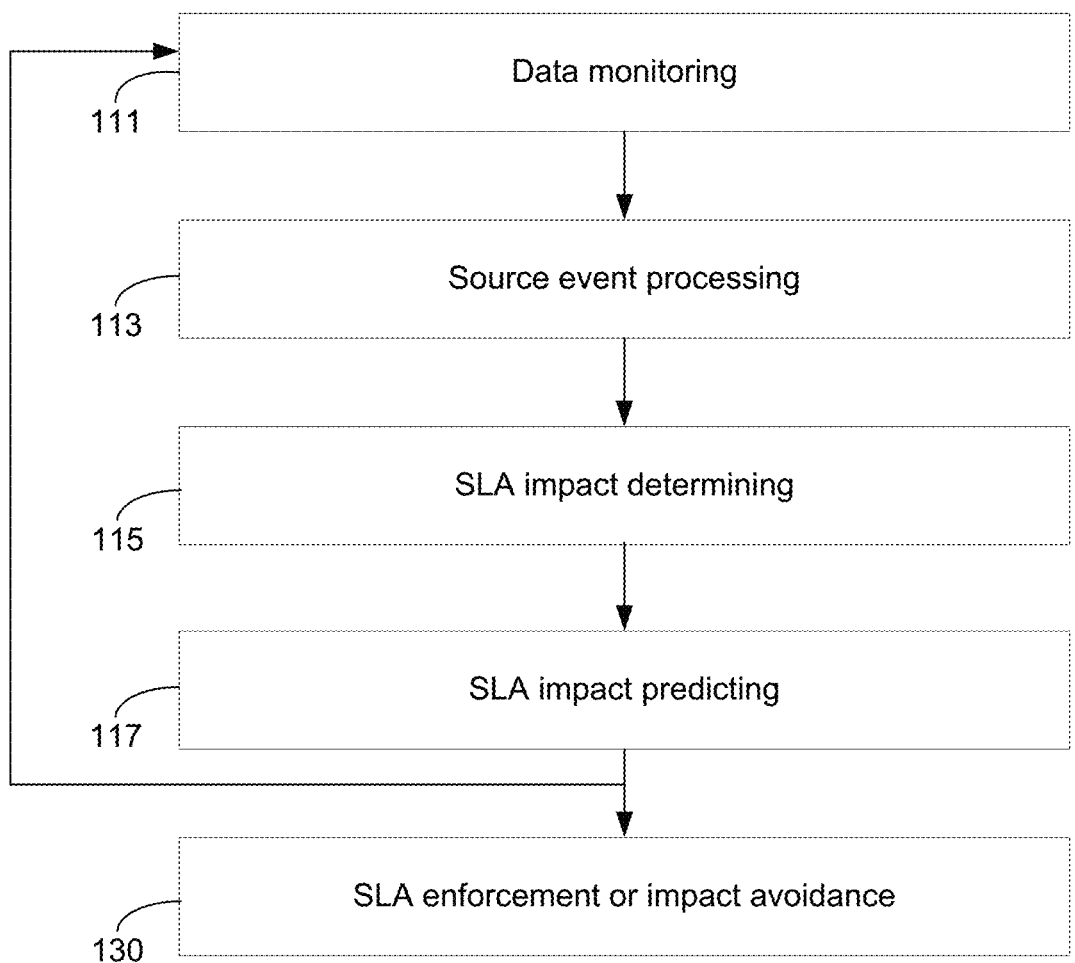
FIG. 2 illustrates an exemplary method flow for predictive SLA impact component.

FIG. 1 illustrates exemplary components of a predictive SLA impact analytics system 101. System 101 may include predictive SLA impact component 103, microservice modeler 105, and SLA enforcement component 107. Predictive SLA impact component 103 may be considered an integrated application method flow for SLA enforcement once the potential SLA impact is detected, as shown in FIG. 2. Microservice Modeler 105 may decompose the predictive SLA impact component 103 into multiple (e.g., smaller and relatively independent) modules called microservices that may be run in a container-based virtualized computing platform. SLA enforcement component 107 may perform capacity auto-scaling operations for user data packet forwarding. SLA impact component 103 and microservice modeler 105 may serve as an enabler for platform resource capacity auto-scaling operations of SLA enforcement component 107 for resource allocation (e.g., reallocation) on-demand supporting data packet forwarding microservices in order to support SLA enforcement when a potential SLA impact is detected. SLA enforcement component 107 may operate in a container-based virtualized computing platform, which may provide more efficient performance with less processing overhead, compared with a conventional virtual machine (VM) computing platform.

Figure 3:
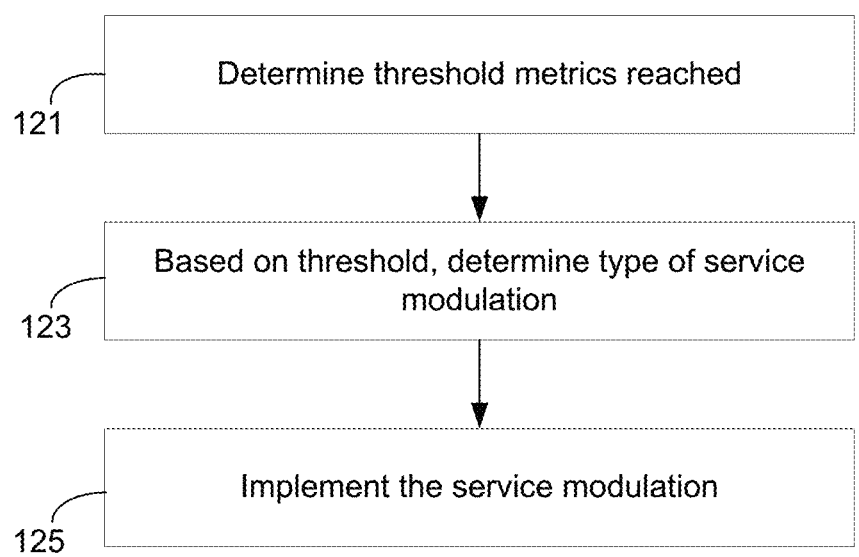
FIG. 3 illustrates an exemplary method flow with regard to microservice modeler 105.

FIG. 2 illustrates an exemplary method flow for predictive SLA impact component 103. In summary, with more details herein, predictive SLA impact component 103 may include the following: monitoring of data (step 111), processing of a source event associated with the monitored data (step 113), measuring metrics associated with the SLA based on the processed source event (step 115), and predicting the SLA impact based on the measured (step 117). Based on the predicted SLA impact (step 117) there may be a need to engage the SLA enforcement component, which includes SLA impact avoidance methods, as shown in FIG. 3.

With continued reference to FIG. 2, disclosed is below detail in view of an exemplary use case. In an exemplary use case there may be a data center cloud that hosts various enterprise customer services, such as voice over internet protocol (VoIP) supported by Long-Term Evolution (LTE) networks. Enterprise customer services can be guided by an SLA agreed by the enterprise customer and the carrier. The quality of service (QoS) parameters in SLA for LTE-based conversational VoIP may include an end-to-end packet delay of 100 ms and packet loss Rate (PLR) of $10^{-1}$ for user data packet forwarding.

There may be constant monitoring of the data associated with services. At step 111, a data monitoring period may start. Subsequent to the start of the data monitoring at step 111, there may be additional steps that may determine a SLA is potentially impacted. So at step 111, an event may be detected based on the monitoring of the data. Example events associated with potential SLA impact may include threshold cross alarm (TCA) (e.g., bandwidth near capacity, computer processor near capacity, storage near capacity) for each of QoS parameter specified in SLA (e.g., packet delay or packet loss rate for enterprise LTE/VoIP). In addition, resource utilization data may be used to determine root cause of SLA performance degradation, which may be due to critical capacity reduction. With this information, the system may initiate capacity auto-scaling to resolve the potential SLA performance degrade issue in step 115. There is not only data monitoring of real-time events (e.g., TCA alarm), but also resource performance log data (e.g., resource capacity utilization, where resources include CPU, storage, networking ports).

At step 113, the events will be processed in order to determine a source event. The system may obtain an indication of the events (e.g., alarms) and eliminate unnecessary alarms. The elimination of the alarms may be based on a parent-child relationship. For example, the source event processor may receive multiple alarms, such as a CRC (cyclic redundancy check) error alarm and bandwidth capacity alarm, among others. The CRC error alarm may be considered the parent alarm based on the alarm being the first alarm detected that is associated with the communication link. At step 115, TCA may be passed to the SLA impact measurer to determine the possible impacts to the SLA, while all other alarms are disregarded. SLA impact is measured through SLA alarms (e.g., TCA). In an example, the potential SLA impact measurer may determine the current state of the SLA for CRC degradation of service quality.

At step 117, the potential SLA impact predictor may determine when the SLA for service quality degrade will be surpassed and all other alarms are disregarded. The SLA impact predictor may increment a metric based on a comparison of values. For example, it may be a ratio associated with end-to-end packet delay is 91 ms, which exceeds 90 ms critical threshold for potential VoIP service impact and the corresponding available network resource (e.g., CPU) capacity is 18%, which is below the designed critical level of 20%. In other words, as described above, once a potential SLA impact is detected, there may be a determination of whether the root cause of this SLA performance degrade (e.g., QoS performance degrade) is due to critical capacity reduction events by correlating multiple measures (e.g., SLA KPI measure and corresponding available network resource capacity). For example, the system may send a notification with regard to a potential SLA impact, if at least one of SLA KPI performance indicators crosses the designed critical level (saying 90%) (e.g., end-to-end packet delay exceeds 90 ms) and the capacity auto-scaling operation can be initiated if the corresponding available network resource (e.g., CPU) capacity below the designed critical level (e.g, 20%). This second measure is associated with critical capacity reduction events. For each TCA(SLA impact) alarm received (e.g., any SLA KPI measure crosses the critical threshold (e.g. 90%)), Identify critical resource component along the SLA end-to-end path and associated available resource capacity data, in which critical component (e.g., physical or virtual network component) of the SLA path may contribute most of the KPI performance along the path.

With continued reference to FIG. 2, to avoid transit behavior, an SLA impact index in a measured period may be calculated. The SLA impact index (Index(SLA Impact)) may incremented by 1 (or another number), if SLA impact metrics meets potential SLA impact criteria. The potential SLA impact may be predicted if the SLA impact index exceeds the designed threshold, which triggers to generate potential SLA impact alerts. In other words, there may be measure whether minimum of resource component's available capacity (AC) along SLA end-to-end path crosses the designed threshold (Th(AC)); if yes, SLA impact index is incremented by 1. If the measure period ends and if SLA impact index exceeds the designed threshold (Th(SLA Impact)), generate SLA impact alerts; otherwise, continue to next measure period. At step 130, based on a determination that there is potential SLA impact, SLA enforcement or SLA impact avoidance (e.g., SLA enforcement component 107) methods are triggered. If the there is no SLA, impact then there is continued data monitoring (step 111).

FIG. 3 illustrates an exemplary method flow with regard to microservice modeler 105. Although it may be beneficial to monitor data of a service in order to meet SLAs, the monitoring itself may negatively affect SLAs. Therefore, it may be beneficial to selectively discretize the method flow of predictive SLA impact component 103. For example, as shown in FIG. 3, at step 121, there is a determination that one or more threshold metrics have been reached. For example, there may be a first metric based on TCA or the like, as disclosed herein. The first metric may be 70% CPU utilization. In addition, a second metric may be directly associated with predictive SLA impact component 103, such as RAM or CPU utilization. Based on the first metric and the second metric being reached within a particular period, then (at step 123) a type of service modularization may be determined. For example, the type may include whether: step 111, 113, 115, or 117 may have their own separate modules, whether the aforementioned steps may be combined in particular combinations based on the threshold(s) met, what virtual or physical machines may house the modules, or whether it is container-based microservice (e.g., Docker), among other things, in any combination. At step 125, the determined type of service modularization is implemented.

Figure 4:
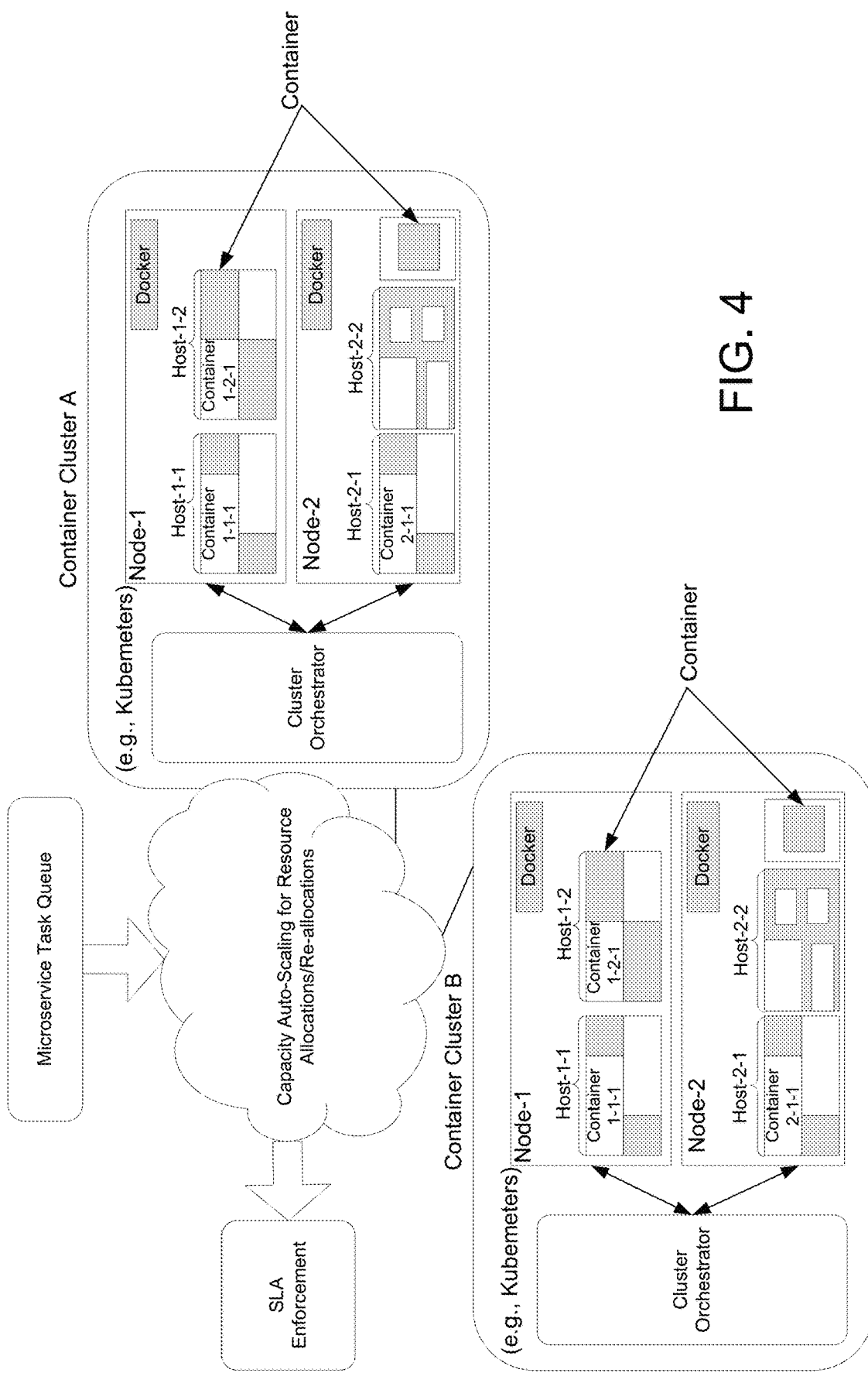
FIG. 4 illustrates an exemplary container cluster and auto-scaling operation.

With continued reference to microservice modeler 105, for further perspective, microservice architecture may allow a task to be efficiently implemented in container-based virtualized computing platform (e.g., Docker) to provide the resources needed by the virtualized network functions (VNFs), when and where they need them with minimum overhead. Predictive SLA Impact component 103 (or SLA Enforcement 107) may be decomposed into several small, decoupled "microservice" components, corresponding to functional components in application workflow described herein. Each microservice may focus on a specific task and may be independently deployable, for example: Monitoring Microservice; Source Event Processing Microservice; SLA Impact Measurement Microservice; or SLA Impact Prediction Microservice. Microservices may be integrated via standard REST APIs to perform analytics application, where APIs can be dynamically assigned as needed. In an example, SLA Impact Prediction Microservice may be implemented and executed in standardized Docker container computing platform of virtualized SDN networks in near-real-time. This may allow for better operations overhead and agility, in comparison with its VM-based counterpart. Execution of these microservices may be triggered by detection of potential SLA impact to support SLA enforcement based on policy guidelines. For each microservice task, Docker container operations may be constantly starting, running, stopping, migrating, and deleting (once the task is completed). A microservices container architecture can call up additional network resources in an automated fashion when needed through moving microservice task to a new container in a machine with lower load. FIG. 4 illustrates an exemplary container cluster and auto-scaling operation.

Disclosed below is SLA enforcement component 107, which provides capacity auto-scaling. Capacity auto-scaling performs near-real-time, on-demand resource allocation/re-allocation to support SLA enforcement based on policy guidelines when potential SLA impact is detected. It performs at the cluster level of the container infrastructure through cluster master orchestrator (e.g., Kubernetes), where each cluster contains several Docker nodes which host a number of containers. There are multiple operations involved in resource auto-scaling operations, which may include container spun-up, stop, live migration, or fail-over.

For each microservice task in the target cluster, capacity auto-scaling may follow the following elements, which may be based on reaching particular thresholds (e.g., delay, capacity, storage, computer processing, etc. . . . for customer services or system 101). A first element may be that when executing a microservice task (e.g., initial task), start new containers on machines where the load is lower and capacity can support task requirement. A second element may be that during execution, stop containers on machines where performance thresholds are being reached. A third element may be if the microservice performance degradation is detected, the cluster orchestrator may perform live migration to move the microservice task to a new container in the same node or other node in the same cluster, if that node's machine has sufficient capacity to support microservice task execution. A fourth element may be if the microservice task fails, the cluster orchestrator may perform fail-over to start a new container in a different cluster with sufficient capacity that can support microservice task re-execution.

Capacity auto-scaling for resource allocation/re-allocation is guided by the policy, which will be updated once resources at the cluster level no longer have sufficient capacity to support dynamic traffic loads of microservice task execution.

Figure 5:
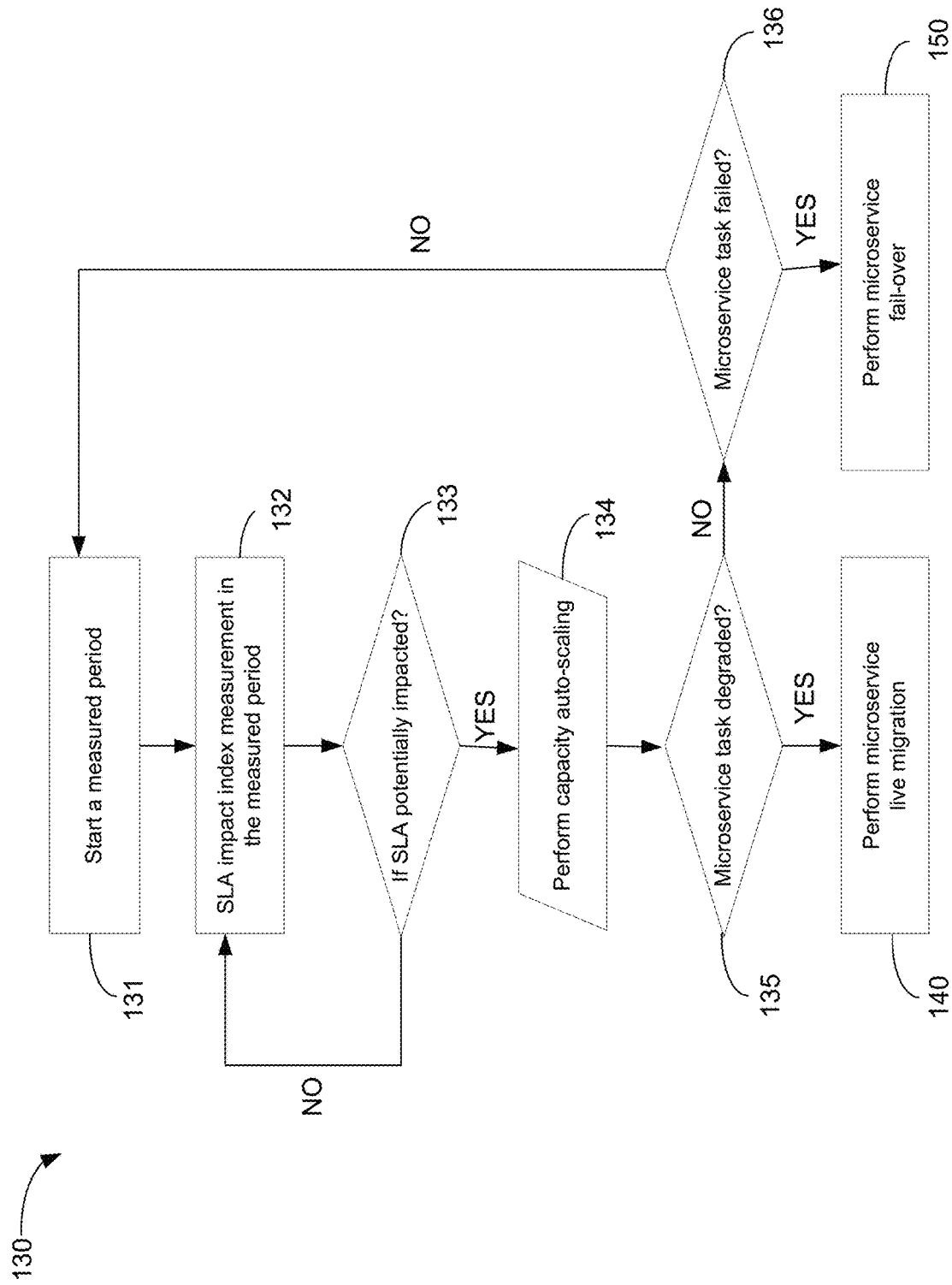
FIG. 5 illustrates an exemplary method flow for SLA enforcement component.
Figure 6:
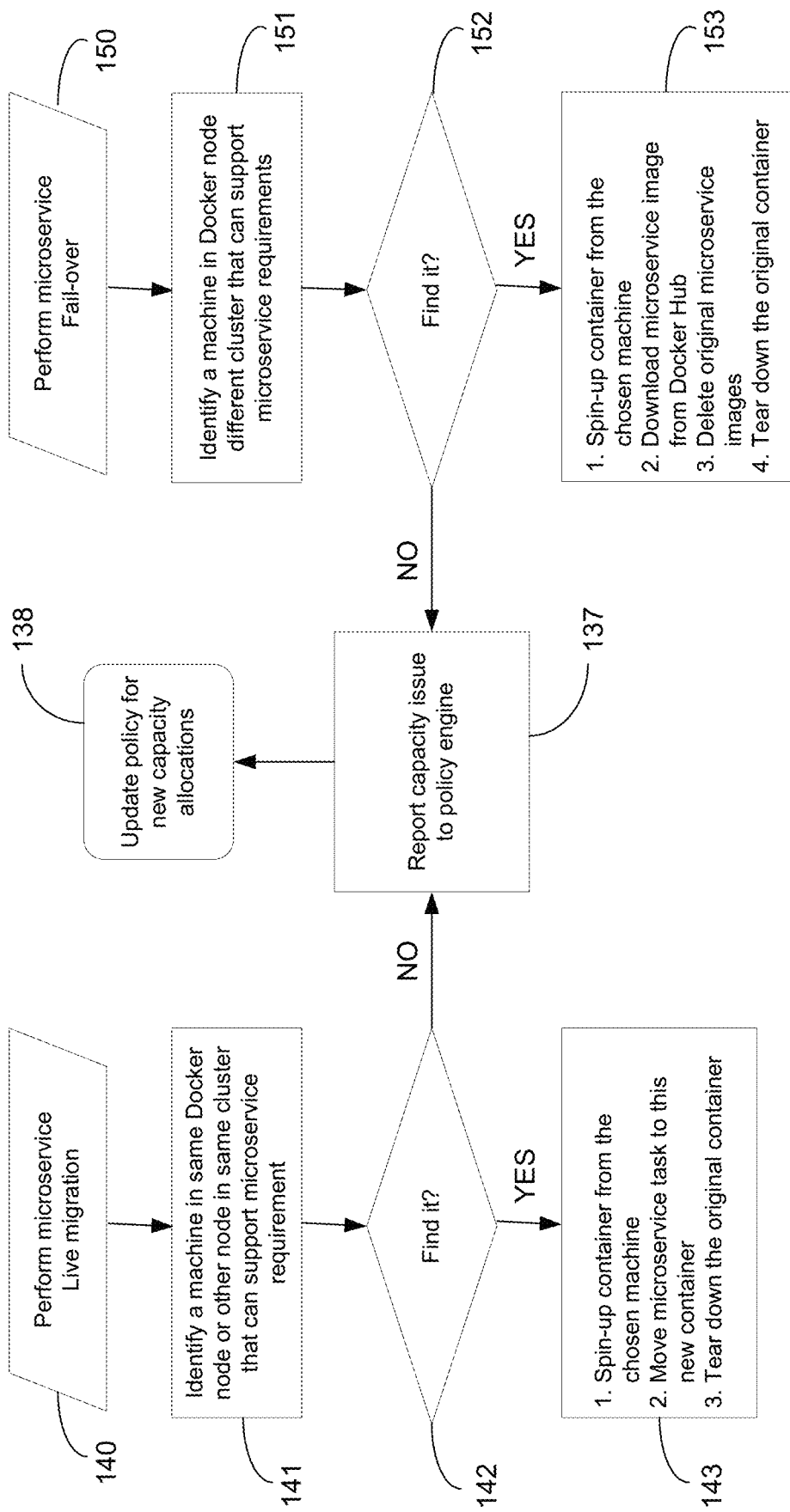
FIG. 6 illustrates an exemplary continuation of the method flow of FIG. 5.

FIG. 5 illustrates an exemplary method flow for SLA enforcement component 130. At step 131, there is a start of a measured period. For example, the start of a 10 minute cycle. At step 132, t SLA KPI, such as end-to-end delay and packet loss rate of user data packet forwarding and device resource utilization are measured during this 10 minute measured cycle. At step 133, if SLA is potentially impacted than go to step 134, and if not then go to step 132. For example, if the measured end-to-end packet delay is measured as 92 ms which exceeds the designated SLA impact threshold of 90 ms and the corresponding device resource utilization is 18% which exceeds the designated threshold of 20%, then the SLA is potentially impacted with possible root cause being capacity reduction issues of user data packet forwarding. In this case, the process moves to step 134, and if not, go to step 132. Once the root cause of SLA impact is determined to be device resource capacity reduction issue, one way to improve SLA performance is to move microservices supported in that device to the other device automatically whose available capacity can support performance requirements of all microservices hosted in the degraded device. This operation is step 134. At step 134, perform capacity auto-scaling for SLA performance improvement via two mechanisms: microservice live migration and microservice fail-over. At step 135, determine whether any microservice tasks hosted by the device is degraded. For example, if the time to execute a data packet forwarding microservice in a container exceeds the designated threshold, then this data packet forwarding microservice task is degraded. If the microservice task is degraded then perform microservice live migration at step 140 (FIG. 6) from the original container to an alternative container hosted in the same node or different node in the same container cluster (FIG. 4) that provides better resource capacity support. If the microservice task is not degraded, then determine if the microservice task failed at step 136. The microservice task is failed if, for example, data packet forwarding microservice, is frozen or not operational. If the microservice task failed at step 136, then proceed to step 150 (FIG. 6). If the microservice task has not failed, then proceed to step 131.

FIG. 6 illustrates an exemplary method of flow in view of step 140 and step 150 as shown in FIG. 5. With reference to performing microservice live migration (method flow 140), at step 141, determine whether to identify an alternative host machine in same Docker node or other node in same cluster (FIG. 4) that may create a container supporting the affected microservice performance requirement. In FIG. 4, each node may host multiple host machines (processors) and each host machine may hosts multiple containers. At step 142, if found (i.e., identified), then proceed to step 143 and if not found, proceed to step 137. For example, in FIG. 4, if the affected microservice task (for example, data packet forwarding microservice) is originally hosted in container-1-1-1 of host-1-1 in Node-1 of Cluster A, this affected microservice may be migrated to container-1-2-1 of host-1-2 in Node-1 if host-1-2 can support the affected microservice performance requirements. If such alternative host in Node-1 can't be found, step 141 will try to find appropriate host in other nodes in the same container cluster (e.g., Container 2-1-1 of host-2-1 in Node 2 in Cluster A in FIG. 4). Once the alternative host for microservice live migration is found, step 143 performs multiple sub-steps. First, a container (e.g., container-2) is spun-up from the chosen host machine (e.g., host-2), secondly, move of microservice task to the new spun-up container (e.g., from container-1-1-1 of Cluster A to container-2-1-1 of Cluster A), and finally tear down of the original container (e.g., container-1-1-1 of Cluster A). With reference to performing microservice failover (method flow 150), at step 151, a host machine may be identified in different Docker node cluster (e.g., host-2-1 of Node-2 in Cluster B in FIG. 4) that may generate a container (e.g., Container 2-1-1 in Cluster B) to support microservice failover from failed container (e.g., from failed container-1-1-1 of Cluster A to new container-2-1-1 of Cluster B in FIG. 4). At step 152, if identified, then proceed to step 153 and if not identified, proceed to step 137. At step 153, there may be multiple sub-steps that may include spin-up of the container from the chosen host machine (e.g., container-2-1-1 of host-2-1 in node-2 of Cluster B), download of microservice image from Docker hub, delete of original microservice images, or tear down of the original container (e.g., container-1-1-1 of Cluster A). If the alternative host machine can't be located to support affected microservices, step 137 generates an alert to the policy engine reporting potential resource capacity insufficient issues in the current hardware platform. At step 138, there may be an update policy for new resource capacity allocations.

Below is additional perspective with regard to microservice auto-scaling that affects achieving SLAs that is disclosed herein. Predictive SLA component 103 may be a monolithic application (analytics flow) for predictive SLA impact analysis, which includes an integrated flow of functional modules (e.g., step 111, step 113, step 115, step 117, Step 130, etc. . . . ). For predictive SLA component 103 (monolithic application approach), you may not deploy functional modules independently, and during execution, any functional module (e.g., step 111, step 113, step 115, step 117, Step 130, etc. . . . ) may fail to execute, then the system (monolithic application approach) needs to re-start execution of this monolithic application all over again.

With the aforementioned monolithic approach concept in mind, since microservice modeler 105 allows for container-based virtualized computing platform that runs nimble modularized software programs. The monolithic application may not be appropriate to implement, particularly in a container-based virtualized platform. The monolithic application may be partitioned into several smaller and independent modules, called microservices that may be efficiently run in container-based virtualized computing platform. The set of microservices in microservice modeler 105 may be the same as the steps of predictive SLA component 103, but unlike the monolithic application, the microservices may be deployed independently, and if one of the microservices (e.g., microservice equivalent to steps of FIG. 2) fails during execution, the system just needs to re-execute the affected microservice using container platform capability without re-starting whole application program, which may include multiple microservice programs.

SLA enforcement component 107 may interact with microservice modeler 105 and predictive SLA impact component 103 as a feedback control loop to improve SLA performance. SLA enforcement component 107 performs capacity auto-scaling in container-based computing platform to improve SLA performance once a potential SLA impact is detected from microservice modeler 105 and predictive SLA impact component 103. Once the capacity auto-scaling operation is executed in SLA enforcement component 107, the may check whether the SLA performance is actually improved due to this capacity auto-scaling operation. SLA enforcement component 107 may execute a set of different operation options for capacity auto-scaling, depending on the detected conditions (e.g., FIG. 5 and FIG. 6), such as the conditions disclosed herein, until SLA impact has been resolved.

Figure 7:
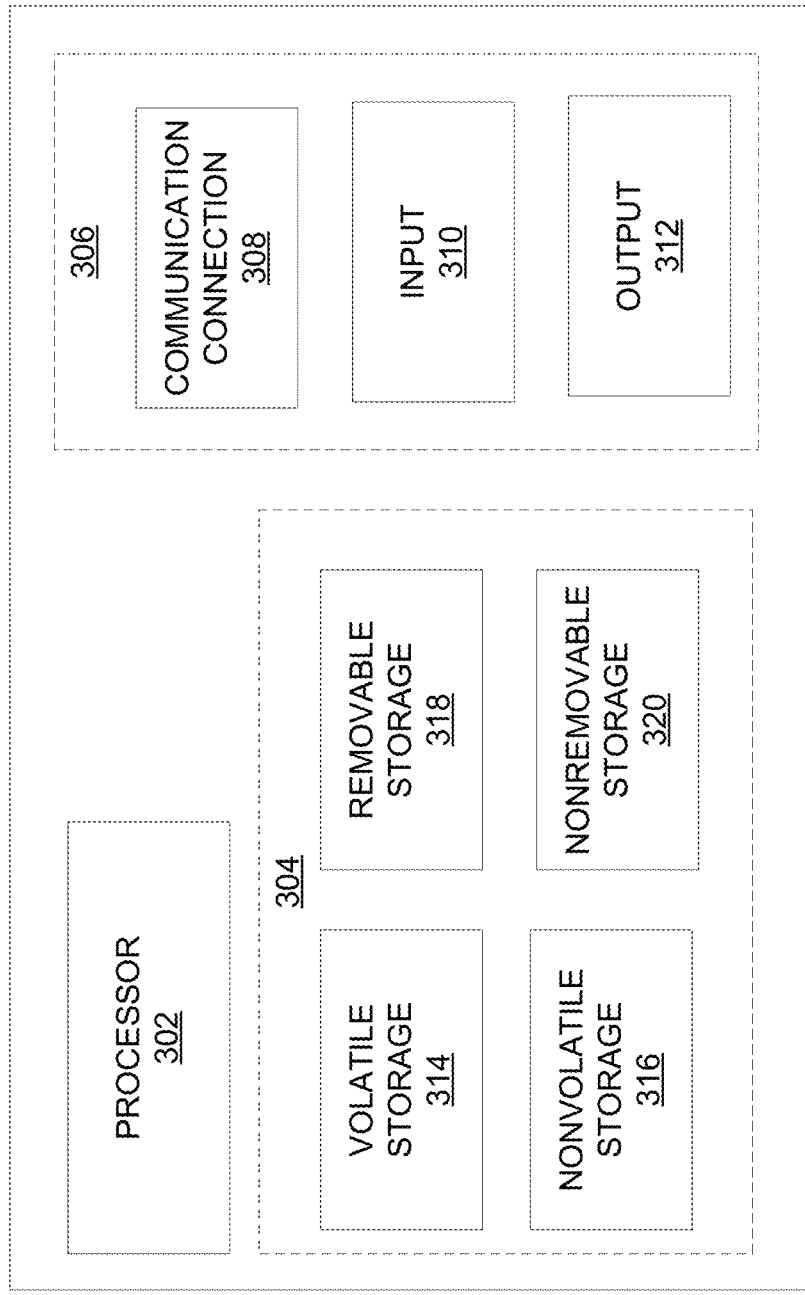
FIG. 7 illustrates a schematic of an exemplary network device.

FIG. 7 is a block diagram of network device 300 that may be connected to or include a component of physical network 600. Network device 300 may include hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may include a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may include circuitry for performing functions associated with each respective portion. Thus, each portion may include hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may include a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may include communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may include a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may include executable instructions that, when executed by processor 302, cause processor 302 to effectuate operations to map signal strengths in an area of interest.

Figure 8:
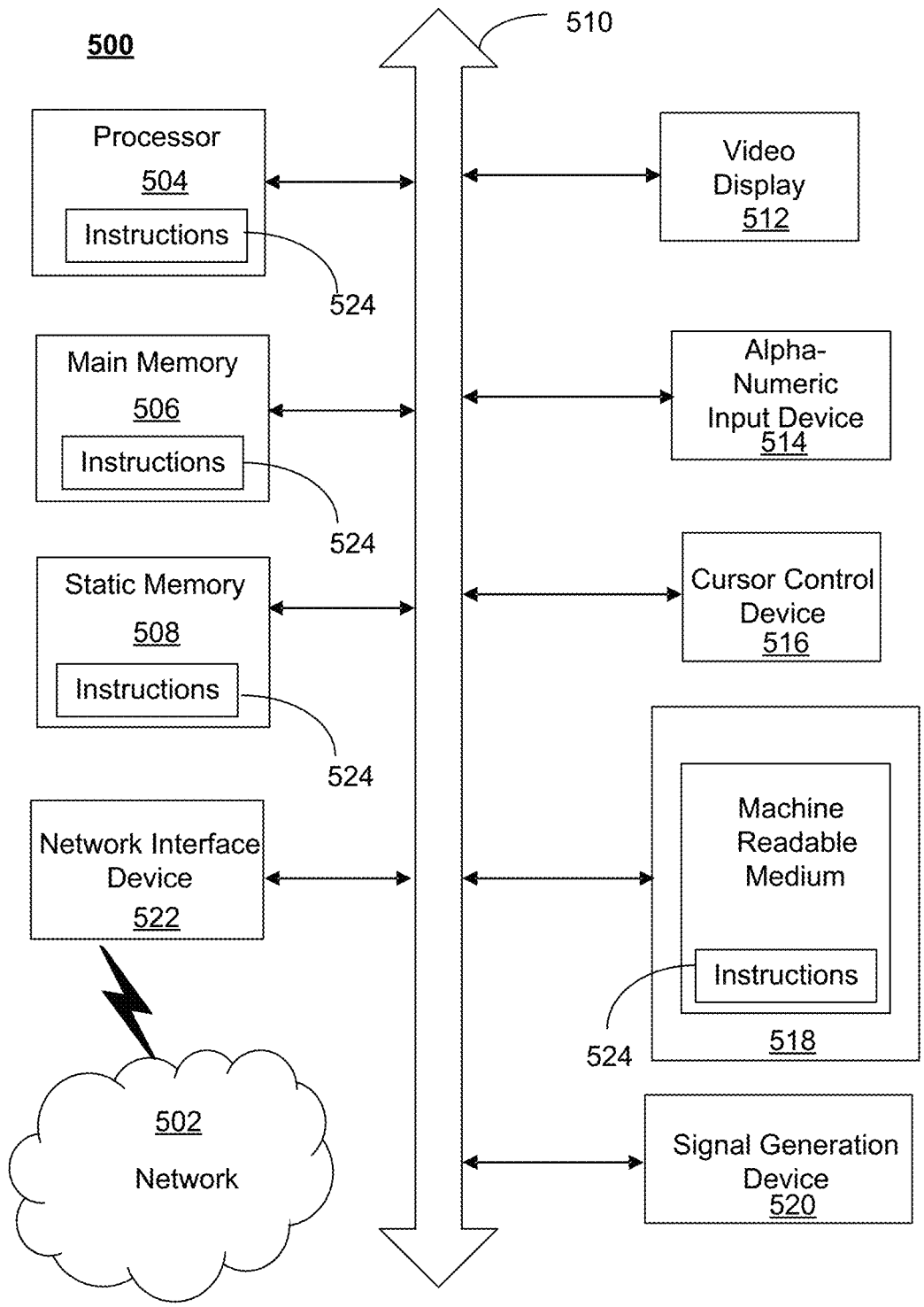
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, hardware platform 606, and other devices mentioned herein. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may include a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9A:
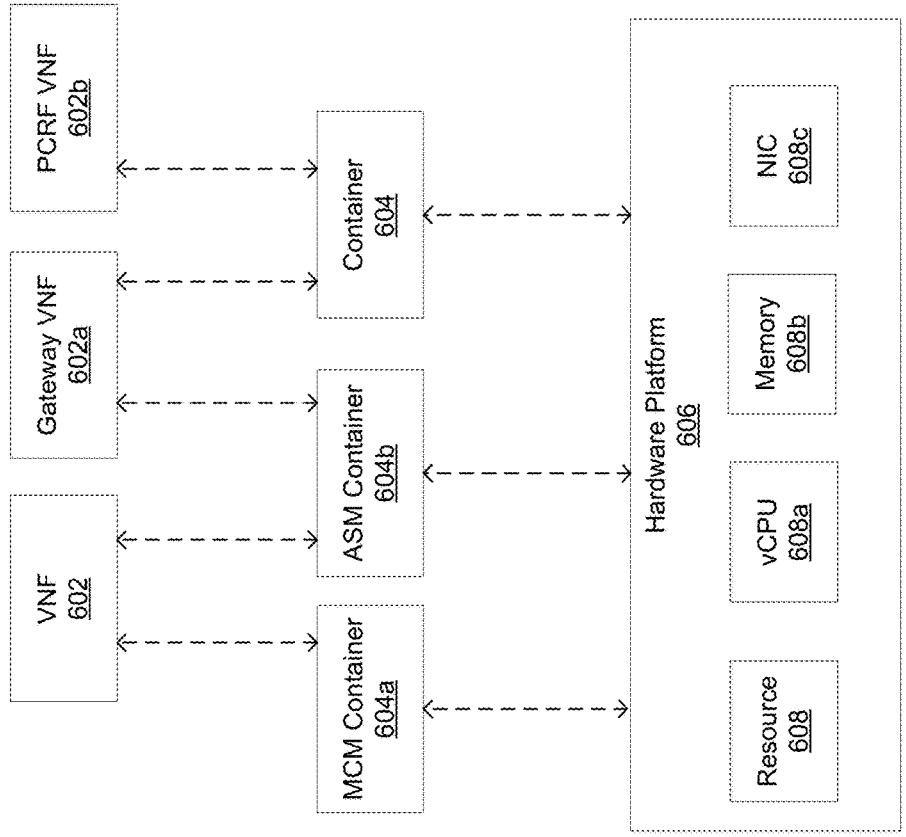
FIG. 9A is a representation of an exemplary network.

FIG. 9A is a representation of an exemplary network 600. Network 600 may include an SDN, for example, network 600 may include one or more virtualized functions implemented on general purpose hardware, such as in lieu of having dedicated hardware for every network function. For example, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9A illustrates a gateway VNF 602a and a policy and charging rules function (PCRF) VNF 602b. Additionally or alternatively, VNFs 602 may include other types of VNFs. Each VNF 602 may use one or more containers 604 to operate. Each Container 604 may have a Container type that indicates its functionality or role. For example, FIG. 9A illustrates a MCM Container 604a, an ASM Container 604b, and a DEP Container 604c. Additionally or alternatively, Containers 604 may include other types of Containers. Each Container 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 9B:
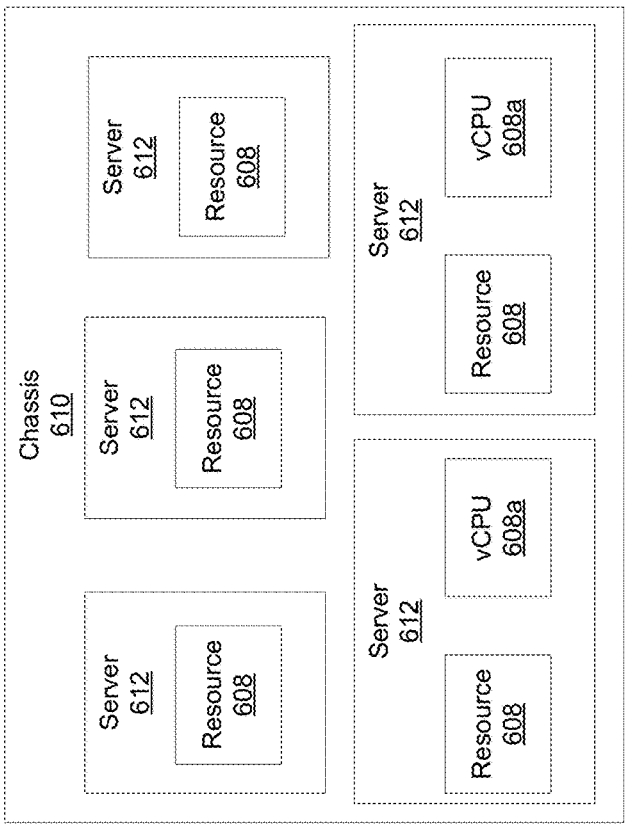
FIG. 9B is a representation of an exemplary hardware platform for a network.
Figure 9B:
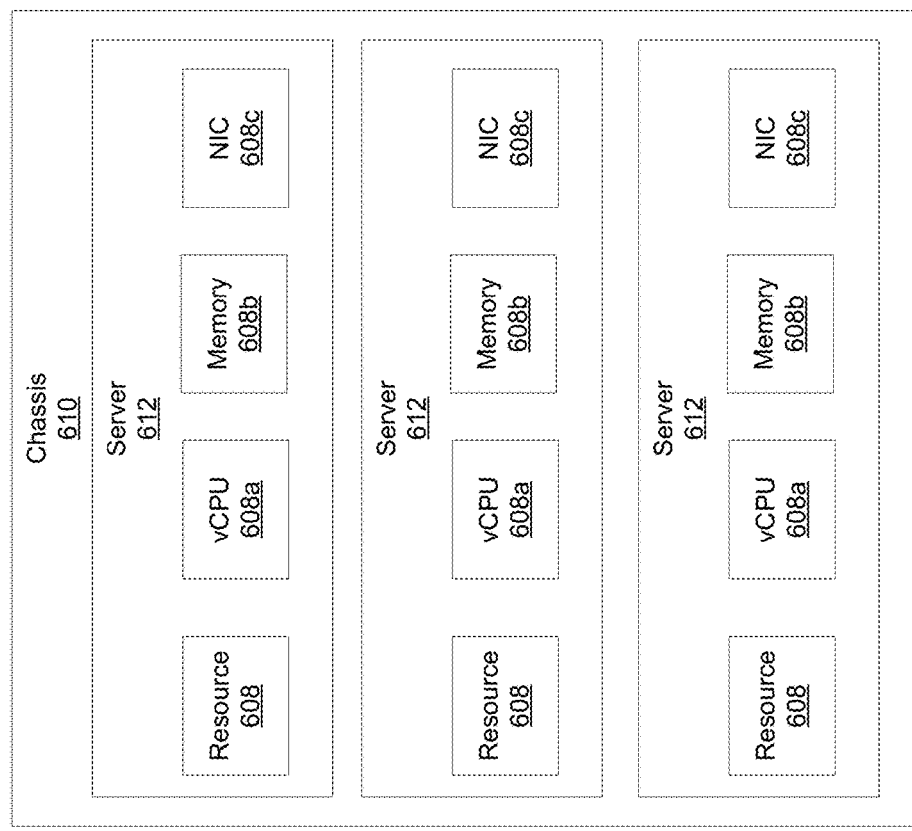

While FIG. 9A illustrates resources 608 as collectively contained in hardware platform 606, the configuration of hardware platform 606 may isolate, for example, certain memory 608c from other memory 608c. FIG. 9B provides an exemplary implementation of hardware platform 606.

Hardware platform 606 may include one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may include general purpose computer hardware or a computer. In an aspect, chassis 610 may include a metal rack, and servers 612 of chassis 610 may include blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 9B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different containers 604. For example, assignment of Containers 604 to particular resources 608 may be constrained by one or more rules. For example, a first rule may require that resources 608 assigned to a particular Container 604 be on the same server 612 or set of servers 612. For example, if Container 604 uses eight vCPUs 608a, 1 GB of memory 608b, and 2 NICs 608c, the rules may require that all of these resources 608 be sourced from the same server 612. Additionally or alternatively, Container 604 may require splitting resources 608 among multiple servers 612, but such splitting may need to conform with certain restrictions. For example, resources 608 for Containers 604 may be able to be split between two servers 612. Default rules may apply. For example, a default rule may require that all resources 608 for a given Container 604 must come from the same server 612.

An affinity rule may restrict assignment of resources 608 for a particular Container 604 (or a particular type of container 604). For example, an affinity rule may require that certain Containers 604 be instantiated on (e.g., consume resources from) the same server 612 or chassis 610. For example, if VNF 602 uses six MCM Containers 604a, an affinity rule may dictate that those six MCM Containers 604a may be instantiated on the same server 612 (or chassis 610). As another example, if VNF 602 uses MCM Containers 604a, ASM Containers 604b, and a third type of Containers 604, an affinity rule may dictate that at least the MCM Containers 604a and the ASM Containers 604b be instantiated on the same server 612 (or chassis 610). Affinity rules may restrict assignment of resources 608 based on the identity or type of resource 608, VNF 602, Container 604, chassis 610, server 612, or any combination thereof.

An anti-affinity rule may restrict assignment of resources 608 for a particular Container 604 (or a particular type of Container 604). In contrast to an affinity rule—which may require that certain Containers 604 be instantiated on the same server 612 or chassis 610—an anti-affinity rule requires that certain Containers 604 be instantiated on different servers 612 (or different chasses 610). For example, an anti-affinity rule may require that MCM Container 604a be instantiated on a particular server 612 that does not contain any ASM Containers 604b. As another example, an anti-affinity rule may require that MCM Containers 604a for a first VNF 602 be instantiated on a different server 612 (or chassis 610) than MCM containers 604a for a second VNF 602. Anti-affinity rules may restrict assignment of resources 608 based on the identity or type of resource 608, VNF 602, Container 604, chassis 610, server 612, or any combination thereof.

Within these constraints, resources 608 of hardware platform 606 may be assigned to be used to instantiate Containers 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five Containers 604 instantiated on the same server 612, and PCRF VNF 602b may require two Containers 604 instantiated on the same server 612. (For this example, assume that no affinity or anti-affinity rules restrict whether Containers 604 for PCRF VNF 602b may or must be instantiated on the same or different server 612 than Containers 604 for gateway VNF 602a.) In this example, each of two servers 612 may have sufficient resources 608 to support 10 Containers 604. To implement sessions using these two servers 612, first server 612 may be instantiated with 10 Containers 604 to support two instantiations of gateway VNF 602a, and second server 612 may be instantiated with 9 Containers: five containers 604 to support one instantiation of gateway VNF 602a and four Containers 604 to support two instantiations of PCRF VNF 602b. This may leave the remaining resources 608 that could have supported the tenth Container 604 on second server 612 unused (and unusable for an instantiation of either a gateway VNF 602a or a PCRF VNF 602b). Alternatively, first server 612 may be instantiated with 10 Containers 604 for two instantiations of gateway VNF 602a and second server 612 may be instantiated with 10 Containers 604 for five instantiations of PCRF VNF 602b, using all available resources 608 to maximize the number of Containers 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible Container 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for Containers 604 for each VNF 602 (e.g., of a certain type), a give requirement for resources 608 to support each Container 604 (e.g., of a certain type), rules dictating the assignment of resources 608 to one or more Containers 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

Containers look like VMs. For example, containers may have private space for processing, may execute commands as root, may have a private network interface and IP address, may allow custom routes and iptable rules, or may mount file systems, among other things. A difference between containers and VMs is that containers may share the host system's kernel with other containers.

While examples of a telecommunications system in which alerts can be processed and managed for auto-scaling and updates have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—microservice auto-scaling that impacts achieving service level agreement—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. It is contemplated herein that there may be some overlap of components 103, 105, and 107, which are logical. Logical components, such as shown in FIG. 1-FIG. 7, may be held on one physical (or virtual) device or appropriately distributed (e.g., microservices), as disclosed herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   a memory coupled with the processor, the memory comprising executable instructions stored thereon that when executed by the processor cause the processor to effectuate operations comprising:
   determining a predictive service level agreement (SLA) impact for a telecommunications service, the determining comprising:
      monitoring data associated with a performance of the telecommunications service, wherein the monitored data comprises data for a resource component's available capacity (AC) along SLA end-to-end path;
      based on the monitoring of the data, obtaining a plurality of alerts, wherein at least a first alert of the plurality of alerts comprises information for an affected network component associated with the telecommunications service; and
      based on the determining that the first alert is a parent event and other alerts of the plurality of alerts are child events of the parent event, eliminating one or more of the child events and determining that:
         a first threshold associated with a potential impact to the SLA for the telecommunications service has been reached; and
         a second threshold associated with the potential impact to the SLA for the telecommunications service has been reached;
      wherein the potential impact includes a threshold cross alarm for each quality of service (QoS) parameter specified in the SLA, and
      wherein each QoS parameter comprises an end-to-end packet delay and a packet loss Rate (PLR); and
   based on reaching the first threshold and second threshold within a period, providing instructions to manipulate network resources in order to reduce the potential impact to the SLA for the telecommunications service.

2. The apparatus of claim 1, wherein the second threshold is associated with a performance indicator of physical device or virtual device.

3. The apparatus of claim 1, wherein the providing instructions to manipulate network resources comprise selectively transforming the predictive SLA into microservices.

4. The apparatus of claim 1, wherein the providing instructions to manipulate network resources comprise selectively transforming the predictive SLA into microservices, wherein the microservices are distributed across multiple virtual devices on a same physical device.

5. The apparatus of claim 1, wherein the providing instructions to manipulate network resources comprise selectively transforming the predictive SLA into microservices, wherein the microservices are distributed across multiple physical devices.

6. The apparatus of claim 1, wherein the providing instructions to manipulate network resources comprise selectively transforming the telecommunications service into microservices.

7. The apparatus of claim 1, wherein the providing instructions to manipulate network resources comprise selectively transforming the telecommunications service into microservices, wherein the microservices are distributed across multiple virtual devices on a same physical device.

8. The apparatus of claim 1, wherein the providing instructions to manipulate network resources comprise selectively transforming the telecommunications service into microservices, wherein the microservices are distributed across multiple physical devices.

9. The apparatus of claim 1, wherein the processor further effectuates operations comprising determining a root cause of SLA performance degradation due to a capacity reduction.

10. The apparatus of claim 9, wherein the processor further effectuates operations comprising initiating capacity auto-scaling to resolve the potential SLA performance degrade issue.

11. A computer readable storage medium storing computer executable instructions that when executed by a computing device cause said computing device to effectuate operations comprising:
   determining a predictive service level agreement (SLA) impact for a telecommunications service, the determining comprising:
      monitoring data associated with a performance of the telecommunications service, wherein the monitored data comprises data for a resource component's available capacity (AC) along SLA end-to-end path;
      based on the monitoring of the data, obtaining a plurality of alerts, wherein at least a first alert of the plurality of alerts comprises information for an affected network component associated with the telecommunications service; and based on the determining that the first alert is a parent event and other alerts of the plurality of alerts are child events of the parent event, eliminating one or more of the child events and determining that:
  a first threshold associated with a potential impact to the SLA for the telecommunications service has been reached; and
  a second threshold associated with the potential impact to the SLA for the telecommunications service has been reached;
  wherein the potential impact includes a threshold cross alarm for each quality of service (QoS) parameter specified in the SLA, and
  wherein each QoS parameter comprises an end-to-end packet delay and a packet loss Rate (PLR); and
based on reaching the first threshold and second threshold within a period, providing instructions to manipulate network resources in order to reduce the potential impact to the SLA for the telecommunications service.

12. The computer readable storage medium of claim 11, wherein the providing instructions to manipulate network resources comprise selectively transforming the predictive SLA into microservices.

13. The computer readable storage medium of claim 11, wherein the providing instructions to manipulate network resources comprise selectively transforming the predictive SLA into microservices, wherein the microservices are distributed across multiple virtual devices on a same physical device.

14. The computer readable storage medium of claim 11, wherein the providing instructions to manipulate network resources comprise selectively transforming the predictive SLA into microservices, wherein the microservices are distributed across multiple physical devices.

15. The computer readable storage medium of claim 11, wherein the providing instructions to manipulate network resources comprise selectively transforming the telecommunications service into microservices, wherein the microservices are distributed across multiple virtual devices on a same physical device.

16. The computer readable storage medium of claim 11, wherein the providing instructions to manipulate network resources comprise selectively transforming the telecommunications service into microservices, wherein the microservices are distributed across multiple physical devices.

17. A method comprising:
  determining a predictive service level agreement (SLA) impact for a telecommunications service, the determining comprising:
    monitoring data associated with a performance of the telecommunications service, wherein the monitored data comprises data for a resource component's available capacity (AC) along SLA end-to-end path;
    based on the monitoring of the data, obtaining a plurality of alerts, wherein at least a first alert of the plurality of alerts comprises information for an affected network component associated with the telecommunications service; and
    based on the determining that the first alert is a parent event and other alerts of the plurality of alerts are child events of the parent event, eliminating one or more of the child events and determining that:
      a first threshold associated with a potential impact to the SLA for the telecommunications service has been reached; and
      a second threshold associated with the potential impact to the SLA for the telecommunications service has been reached;
      wherein the potential impact includes a threshold cross alarm for each quality of service (QoS) parameter specified in the SLA, and
      wherein each QoS parameter comprises an end-to-end packet delay and a packet loss Rate (PLR); and
  based on reaching the first threshold and second threshold within a period, providing instructions to manipulate network resources in order to reduce the potential impact to the SLA for the telecommunications service.

18. The method of 17, wherein the second threshold is associated with a performance indicator of physical device or virtual device.

19. The method of 17, wherein the providing instructions to manipulate network resources comprise selectively transforming the predictive SLA into microservices.

20. The method of 17, wherein the providing instructions to manipulate network resources comprise selectively transforming the telecommunications service into microservices.

* * * * *